US010013093B2

(12) United States Patent
Kano et al.

(10) Patent No.: US 10,013,093 B2
(45) Date of Patent: Jul. 3, 2018

(54) TOUCH INPUT DEVICE AND TOUCH INPUT DETECTING METHOD (71) Applicant: MURATA MANUFACTURING CO., LTD., Nagaokakyo-shi, Kyoto-fu (JP)

(72) Inventors: Hidekazu Kano, Nagaokakyo (JP); Hiroaki Kitada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 51 days.

(21) Appl. No.: 14/876,418

(22) Filed: Oct. 6, 2015

(65) Prior Publication Data

US 2016/0034089 A1 Feb. 4, 2016

Related U.S. Application Data (63) Continuation of application No. PCT/JP2014/063900, filed on May 27, 2014.

(30) Foreign Application Priority Data

May 28, 2013 (JP) ................. 2013-111673

(51) Int. Cl.
*G06F 3/041* (2006.01)
*G06F 3/044* (2006.01)
(52) U.S. Cl.
CPC ............ *G06F 3/0414* (2013.01); *G06F 3/044* (2013.01); *G06F 3/0416* (2013.01); *G06F 2203/04104* (2013.01); *G06F 2203/04105* (2013.01)
(58) Field of Classification Search
CPC ........... G06F 3/044; G06F 2203/04104; G06F 2203/04105

(Continued)

(56) References Cited

U.S. PATENT DOCUMENTS 8,704,787 B2    4/2014  Yamamoto et al.
2004/0108995 A1*  6/2004  Hoshino ................ F16M 11/10
                                            345/173

(Continued)

FOREIGN PATENT DOCUMENTS

CN    101551723 A    10/2009
CN    102279664 A    12/2011

(Continued)

OTHER PUBLICATIONS

International Search Report for PCT/JP2014/063900, dated Jul. 29, 2014.

*Primary Examiner* — Jonathan Blancha
(74) *Attorney, Agent, or Firm* — Arent Fox LLP (57) ABSTRACT

A touch input device that includes an operation input unit, a control unit, a memory unit and a display unit. The operation input unit includes a pressing sensor and a touch sensor. When obtaining a detected operation position (x, y) based on an operation detection signal from the touch sensor, the control unit compares a signal level $D_{Sp}$ of a press detection signal from the pressing sensor and a first threshold $TH_{Sp}$. When determining that the signal level $D_{Sp}$ is larger than the first threshold $TH_{Sp}$, the control unit reads the detected operation position (x, y) obtained immediately before the determination, and fixes the detected operation position (x, y). The control unit determines operation input contents by using the fixed detected operation position (x, y) and a pressing amount based on the signal level $D_{Sp}$ obtained at each sampling timing.

19 Claims, 7 Drawing Sheets (58) Field of Classification Search
USPC .......................................................... 345/173
See application file for complete search history.

(56) References Cited

U.S. PATENT DOCUMENTS

| | | | | |
|---|---|---|---|---|
| 2008/0303799 | A1* | 12/2008 | Schwesig | G06F 3/0414 |
| | | | | 345/173 |
| 2009/0251432 | A1* | 10/2009 | Wang | G06F 3/04883 |
| | | | | 345/173 |
| 2009/0315847 | A1* | 12/2009 | Fujii | G06F 3/04883 |
| | | | | 345/173 |
| 2010/0289508 | A1* | 11/2010 | Joguet | G06F 3/044 |
| | | | | 324/686 |
| 2011/0304567 | A1 | 12/2011 | Yamamoto et al. | |
| 2012/0026110 | A1 | 2/2012 | Yamano et al. | |
| 2012/0075226 | A1 | 3/2012 | Andoh et al. | |
| 2012/0147052 | A1* | 6/2012 | Homma | G06F 3/044 |
| | | | | 345/660 |
| 2012/0306766 | A1* | 12/2012 | Moore | G06F 3/04883 |
| | | | | 345/173 |
| 2013/0050143 | A1* | 2/2013 | Kim | G06F 3/0488 |
| | | | | 345/174 |
| 2013/0088437 | A1 | 4/2013 | Nishidate et al. | |

FOREIGN PATENT DOCUMENTS

| | | |
|---|---|---|
| JP | 5-61592 A | 3/1993 |
| JP | 2011-258043 A | 12/2011 |
| JP | 2012-003305 A | 1/2012 |
| JP | 2012-027875 A | 2/2012 |
| WO | WO 2010/143528 A1 | 12/2010 |

\* cited by examiner

1: BEFORE TOUCH

2: TOUCH
(SUBSTANTIALLY NO LOAD)

3: TOUCH (LIGHT LOAD)

4: TOUCH (HEAVY LOAD)

TOUCH INPUT DEVICE AND TOUCH INPUT DETECTING METHOD

CROSS REFERENCE TO RELATED APPLICATIONS

The present application is a continuation of International application No. PCT/JP2014/063900, filed May 27, 2014, which claims priority to Japanese Patent Application No. 2013-111673, filed May 28, 2013, the entire contents of each of which are incorporated herein by reference.

FIELD OF THE INVENTION

The present invention relates to a touch input device which detects an operation input by detecting a touch position on an operation surface and detecting a pressing amount with respect to the operation surface.

BACKGROUND OF THE INVENTION

Conventionally, various touch input devices which each detect an operation input when an operator touches an operation surface are devised. The touch input devices include a touch input device which detects a touch position and detects an operation input based on the detected touch position, and a touch input device which detects a press on or a pressing amount with respect to an operation surface and detects an operation input based on whether or not there is the press or the pressing amount.

Among these devices, various touch input devices which each can detect a touch position and detect a press or a pressing amount are also devised and, for example, include components described in Patent Literature 1.

The touch input device described in Patent Literature 1 adopts a structure obtained by overlapping a pressure-sensitive sensor of a flat shape and a touch panel of a flat shape. The pressure-sensitive sensor detects a pressing amount, and the touch panel detects an operation position.

PTL 1: Japanese Patent Application Laid-Open No. 5-61592

SUMMARY OF THE INVENTION

However, such a touch input device which detects a touch position and a pressing amount has the following problem.

Figure 7:
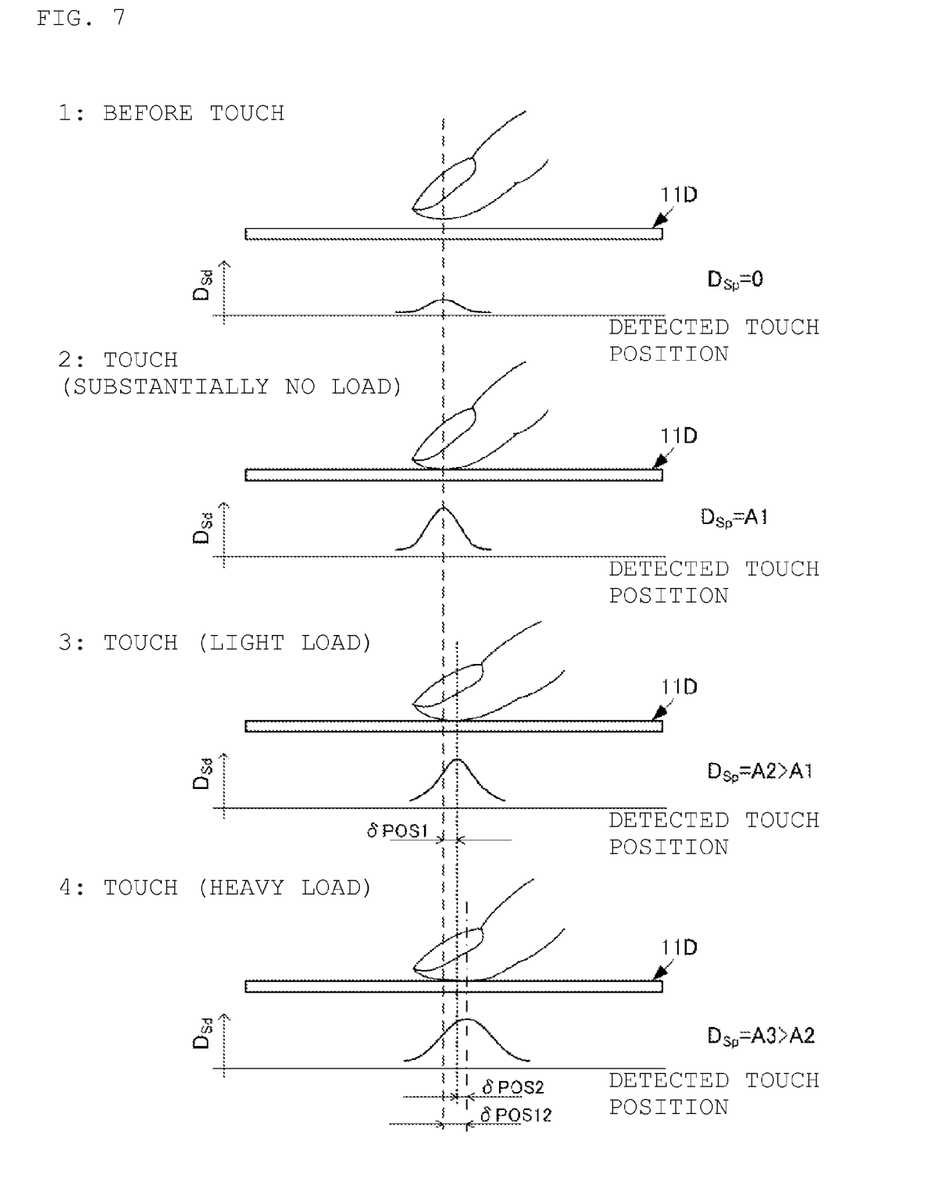
FIG. 7 is a side view illustrating a process from a time at which an operator's finger does not yet touch an operation surface of the touch input device, to a time at which the operator's finger touches the operation surface and applies a pressing force thereto.

FIG. 7 is a side view illustrating a process from a time at which an operator's finger does not yet touch an operation surface of a touch input device, to a time at which the operator's finger touches the operation surface and applies the pressing force thereto, and illustrates only components of the touch input device schematically related to one detection axis of a touch sensor 11D which detects a touch position.

FIG. 7 illustrates 1: before touch, 2: touch, 3: touch (light load) and 4: touch (heavy load).

2: touch indicates a state where the operator's finger touches the operation surface and little load is applied. 3: touch (light load) indicates a state where the operator's finger touches the operation surface and lightly presses the operation surface. 4: touch (heavy load) indicates a state where the operator's finger touches the operation surface and strongly presses the operation surface.

1: Before Touch

Before a touch, when the finger is away from the operation surface, a signal level $D_{Sd}$ of an operation position detection signal Sd is 0. In this regard, as illustrated in FIG. 7, even when the finger is not in touch with the operation surface, if the touch is so close that a capacitance is produced, a value which is not 0 is detected even though the signal level $D_{Sd}$ of the operation position detection signal Sd is weak. In this case, the signal level $D_{Sd}$ is distributed such that a peak comes at a position at which the finger on the operation surface is the closest and levels lower apart from the peak position. In addition, the operation surface is not pressed, and therefore the signal level $D_{Sp}$ of the press detection signal SP is 0.

2: Touch (Substantially No Load)

When the finger is in touch with the operation surface, the signal level $D_{Sd}$ of the operation position detection signal Sd takes a value which is not 0. In this case, the signal level $D_{Sd}$ is distributed such that a peak comes at a center position of a position at which the finger on the operation surface touches and levels lower apart from the peak position. In addition, the finger is in touch with the operation surface and applies little pressing force thereto, and therefore the signal level $D_{Sp}$ of the press detection signal Sp is A1 which is close to 0.

3: Touch (Light Load)

When the finger is in touch with the operation surface and applies a light pressing force thereto, the signal level $D_{Sd}$ of the operation position detection signal Sd takes a value which is not 0 similar to 2: touch. In this case, the signal level $D_{Sd}$ is distributed such that a peak comes at a center position of a position at which the finger on the operation surface touches and levels lower apart from the peak position. In addition, the finger presses the operation surface, and therefore the signal level $D_{Sp}$ of the press detection signal Sp is A2 which is higher than A1.

In this regard, due to a finger structure, an increased pressing force (increased pressing amount) moves a pressing position, i.e., an operation position toward the base of the finger. That is, as illustrated in FIG. 7, the operation position detected in 3: touch (light load) and the operation position detected in 2: touch (substantially no load) are different. The operation position detected in 3: touch (light load) is at a position further moved by a movement amount δPOS1 from the operation position detected in 2: touch (substantially no load).

4: Touch (Heavy Load)

When the finger is in touch with the operation surface and applies a strong pressing force thereto, the signal level $D_{Sd}$ of the operation position detection signal Sd takes a value which is not 0 similar to 2: touch (substantially no load) and 3: touch (light load). In this case, the signal level $D_{Sd}$ is distributed such that a peak comes at a center position of a position at which the finger on the operation surface touches and levels lower apart from the peak position. In addition, the finger more strongly presses the operation surface, and therefore the signal level $D_{Sp}$ of the press detection signal Sp is A3 which is higher than A2.

In this regard, due to the finger structure, a more increased pressing force (more increased pressing amount) moves a pressing position, i.e., an operation position toward the base of the finger. That is, as illustrated in FIG. 7, the operation position detected in 4: touch (heavy load) and the operation position detected in 3: touch (light load) are different. The operation position detected in 4: touch (heavy load) is at a position further moved by a movement amount δPOS2 from the operation position detected in 3: touch (light load). That is, the operation position detected in 4: (heavy load) is at a position moved by a movement amount δPOS12 (=δPOS1+ δPOS2) from the operation position detected in 2: touch (substantially no load).

Thus, when the finger presses the operation surface to change a pressing amount, an operation position to be detected changes according to the pressing amount. Particularly when a pressing amount is large, an operation position to be detected significantly changes from a position which has been touched first.

In case where such a phenomenon occurs, a problem occurs when operation input contents are determined based on an operation position and a pressing amount. When, for example, an image is displayed on the operation surface and processing of enlarging or reducing the image of an operation position is performed to change an enlargement rate or a reduction rate based on a trigger of starting the enlargement or the reduction based on the press or based on the pressing amount, the operation position changes and therefore the position of the image to be enlarged changes. Thus, an unintended position is enlarged or reduced.

It is therefore an object of the present invention to provide a touch input device which prevents an operation position to be detected from changing due to a press.

A touch input device according to the present invention includes a touch sensor, a pressing sensor and a control unit. The touch sensor detects an operation position on an operation surface and outputs an operation detection signal. The pressing sensor detects a press on the operation surface and outputs a press detection signal. The control unit determines operation input contents by using the operation detection signal and the press detection signal. Further, when detecting that a signal level of the press detection signal has become larger than a first threshold after detecting the operation position based on the operation detection signal, the control unit determines the operation input contents by using an operation position obtained before the signal level of the press detection signal becomes larger than the first threshold, and the signal level of the press detection signal.

According to this configuration, even when the pressing force with respect to the operation surface increases and an operation position detected based on an operation detection signal changes, the operation position to be outputted is fixed to an operation position detected before the pressing force is applied. Consequently, it is possible to determine operation input contents based on an operation position and a pressing amount which an operator intends.

Further, preferentially, the touch input device according to the present invention is configured as follows. When detecting that a change amount of the detected operation position has become larger than a second threshold after detecting that the signal level of the press detection signal has become larger than the first threshold, the control unit determines the operation input contents by using the operation position detected after the change, and a signal level of a press detection signal obtained at a point of time at which the operation position is detected.

According to this configuration, when the operation position is intentionally moved in a state where the operation surface is pressed by a high pressing force, it is possible to detect movement of the operation position.

Further, preferentially, the touch input device according to the present invention is configured as follows. When detecting that the signal level of the operation detection signal is the third threshold or less, the control unit skips processing of comparing the signal level of the press detection signal and the first threshold, and determines the operation input contents by using the detected operation position and the signal level of the press detection signal.

According to this configuration, even when the press becomes larger than a predetermined threshold, the operation position is not fixed, so that it is possible to move the detected operation position according to a movement of a fingertip or a stylus.

That is, even when an operation is inputted by using a medium, except for the finger, whose gravity center does not change according to a pressing amount, it is possible to accurately detect operation input contents.

Further, the touch input device according to the present invention is preferably configured as follows. When detecting that the signal level of the press detection signal has become less than a fourth threshold after obtaining the operation position and the signal level of the press detection signal for determining the operation input contents, the control unit detects an end of an operation input.

According to this configuration, it is possible to reliably detect that a series of operations of an operation input has been finished.

Further, the pressing sensor of the touch input device according to the present invention preferably includes a piezoelectric film made of a uniaxially stretched polylactic acid.

According to this configuration, it is possible to reliably a signal level of a press detection signal with a high sensitivity.

According to the present invention, even when a pressing amount with respect to the operation surface changes, it is possible to prevent an operation position from being erroneously detected due to a change of an operation position to be detected. Consequently, even when the operator touches the operation surface with a finger and applies a pressing force thereto, it is possible to determine that the operator has touched the operation position which the operator intends.

DETAILED DESCRIPTION OF THE INVENTION

Figure 1:
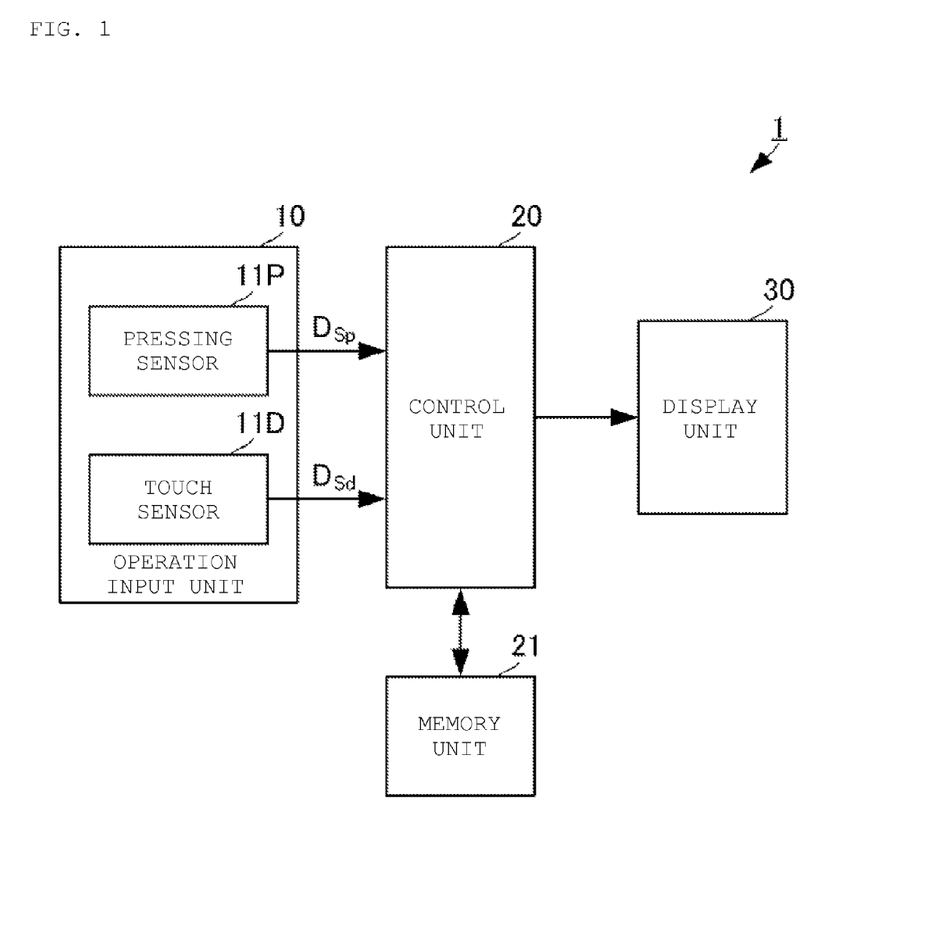
FIG. 1 is a block diagram of a touch input device according to a first embodiment of the present invention.

A touch input device according to the first embodiment of the present invention will be described with reference to the accompanying drawings. FIG. 1 is a block diagram of the touch input device according to the first embodiment of the present invention.

As illustrated in FIG. 1, a touch input device 1 according to the present invention includes an operation input unit 10 which is a touch panel, a control unit 20, a memory unit 21 and a display unit 30.

The operation input unit 10 includes a pressing sensor 11P and a touch sensor 11D.

When an operation surface of the touch panel is pressed, the pressing sensor 11P generates a press detection signal of a signal level $D_{Sp}$ corresponding to a pressing amount (pressing force). The pressing sensor 11P outputs a press detection signal to the control unit 20.

The touch sensor 11D generates an operation detection signal corresponding to an operation position of the operation surface of the touch panel. In addition, the signal level $D_{Sd}$ of the operation detection signal depends on a change amount of the capacitance produced when an operator's finger approaches or touches the touch sensor 11D. The touch sensor 11D outputs the operation detection signal to the control unit 20.

The control unit 20 determines operation input contents based on the press detection signal and the operation detection signal. In this regard, the control unit 20 uses the memory unit 21 as a memory region for processing of determining operation input contents. The control unit 20 generates image data based on the determined operation input contents and outputs the image data to the display unit 30. The display unit 30 displays an image on a screen based on the image data.

Figure 2:
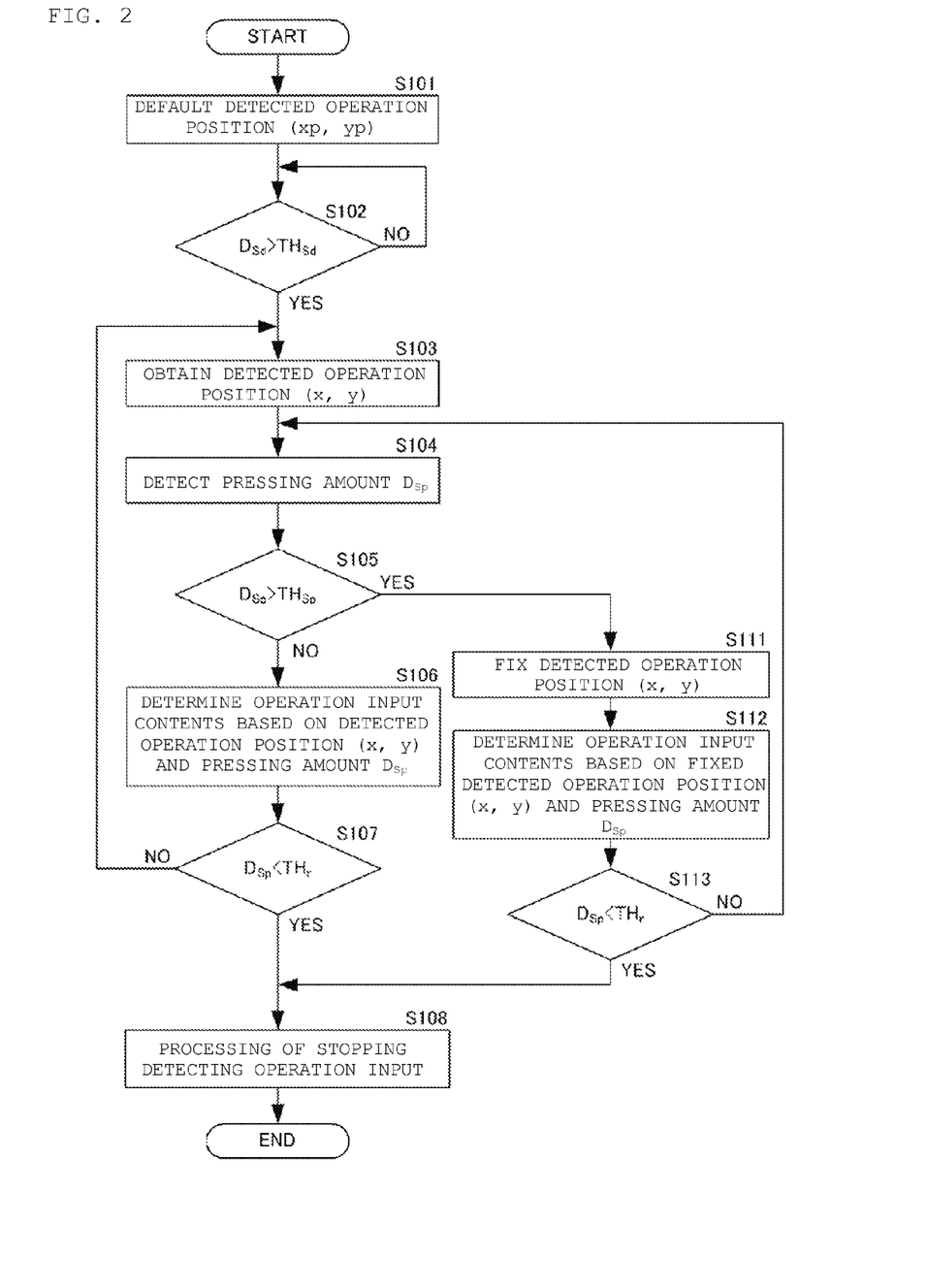
FIG. 2 is a flowchart illustrating processing executed by a control unit of the touch input device according to the first embodiment of the present invention.

Next, processing of determining specific operation input contents in the control unit 20 will be described with reference to FIG. 2. FIG. 2 is a flowchart illustrating processing executed by the control unit of the touch input device according to the first embodiment of the present invention. In addition, in FIG. 2, the signal level $D_{Sp}$ of a pressing force detection signal is indicated as the pressing amount $D_{Sp}$. This is because that the signal level of the pressing force detection signal is determined depending on the pressing amount and is regarded in the same way in terms of detection of the operation input contents.

The control unit 20 determines a default detected operation position (xp, yp) when starting the processing of determining the operation input contents (S101). The default detected operation position (xp, yp) may be any position as long as the position in an operation position detectable range, and may be a center or a corner of the detectable range.

The control unit 20 obtains the signal level $D_{Sd}$ of the operation detection signal. In a period in which the signal level $D_{Sd}$ is a touch detection threshold $TH_{Sd}$ or less, the control unit 20 maintains the default detected operation position (xp, yp), and continues detecting a touch (S102: NO). The touch detection threshold $TH_{Sd}$ needs to be set to, for example, a signal level between the signal level $D_{Sd}$ detected when the finger approaches the operation surface without touching the operation surface, and the signal level $D_{Sd}$ detected when the finger is reliably in touch with the operation surface. In addition, the signal level $D_{Sd}$ may be a peak value or an integral value.

When detecting that the signal level $D_{Sd}$ has become larger than the touch detection threshold $TH_{Sd}$ (S102: YES), the control unit 20 obtains an operation detected operation position (x, y) from the operation detection signal of the detected timing (S103).

When obtaining the detected operation position (x, y), the control unit 20 detects the signal level (pressing amount) $D_{Sp}$ of the pressing force detection signal (S104). In addition, the signal level (pressing amount) $D_{Sp}$ of a pressing force detection signal will be simply referred to as the pressing amount $D_{Sp}$ hereinafter.

The control unit 20 determines whether or not the pressing amount $D_{Sp}$ is larger than a first threshold $TH_{Sp}$. The first threshold $TH_{Sp}$ is a threshold for determining whether or not to fix the detected operation position (x, y). Consequently, the first threshold $TH_{Sp}$ is set to the signal level $D_{Sp}$ detected when the finger is reliably in touch with the operation surface and lightly presses the operation surface. For example, the first threshold $TH_{Sp}$ is set to a value between A1 and A2 illustrated in FIG. 7.

When determining that the pressing amount $D_{Sp}$ is the first threshold $TH_{Sp}$ or less (S105: NO), the control unit 20 determines operation input contents based on the detected operation position (x, y) and the pressing amount $D_{Sp}$ at a point of time of the determination (S106).

The control unit 20 compares the pressing force $D_{Sp}$ and a third threshold $TH_r$ in a period in which the operation input contents are determined by using the detected operation position (x, y) and the pressing amount $D_{Sp}$. When determining that the pressing force $D_{Sp}$ is a fourth threshold $TH_r$ or more (S107), the control unit 20 returns to processing of the detected operation position (x, y) (S103). Meanwhile, when determining that the pressing force $D_{Sp}$ is less than the fourth threshold $TH_r$ (S107: YES), the control unit 20 stops processing of detecting the operation input contents (S108).

When determining that the pressing amount $D_{Sp}$ is larger than the first threshold $TH_{Sp}$ (S105: YES), the control unit 20 reads the detected operation position (x, y) obtained immediately before the determination, and fixes the detected operation position (x, y) (S111). This processing can be realized by causing the control unit 20 to successively store in the memory unit 21 the detected operation position (x, y) at each sampling timing. When determining that the pressing amount $D_{Sp}$ is larger than the first threshold $TH_{Sp}$, the control unit 20 reads the latest detected operation position stored in the memory unit 21 at a timing of this determination. In addition, when storing detected operation positions in the memory unit 21 while successively updating the detected operation positions, the control unit 20 simply reads the detected operation position stored in the memory unit 21.

The control unit 20 determines the operation input contents based on the fixed detected operation position (x, y) and the detected pressing amount $D_{Sp}$ (S112). That is, after determining that the pressing amount $D_{Sp}$ is larger than the first threshold $TH_{Sp}$, the control unit 20 outputs the pressing amount $D_{Sp}$ as a value corresponding to this change, and outputs the detected operation position (x, y) as a fixed value. Hence, the control unit 20 determines operation input contents based on the fixed detected operation position (x, y) and the pressing amount $D_{Sp}$ at each point of time, successively. When, for example, the pressing amount $D_{Sp}$ increases, the control unit 20 determines the operation input contents corresponding to the increased pressing amount $D_{Sp}$ without changing the detected operation position (x, y).

Even in case where such processing is performed, and therefore the pressing force increases and a center of a touch surface of the finger moves contrary to the operator's intention after the operator touches the operation surface with the finger, a detected operation position obtained before the pressing force increases, i.e., a touch position, is outputted as the detected operation position (x, y).

Consequently, when operation input contents are determined based on an operation position and a pressing amount, it is possible to determine the operation input contents which accurately reflect the operation position and the pressing amount which the operator intends.

In case of, for example, the above image enlargement/reduction processing, the operator can accurately enlarge or reduce a position which the operator wants to enlarge or reduce. Further, the operator can accurately enlarge or reduce the image according to the pressing amount.

The control unit 20 compares the pressing force $D_{Sp}$ and the third threshold $TH_r$ in a period in which the operation input contents are determined by using the fixed detected operation position (x, y) and the pressing amount $D_{Sp}$. When determining that the pressing force $D_{Sp}$ is the fourth threshold $TH_r$ or more (S113: NO), the control unit 20 returns to processing of detecting the pressing amount $D_{Sp}$ (S104). Meanwhile, when determining that the pressing force $D_{Sp}$ is less than the fourth threshold $TH_r$ (S113: YES), the control unit 20 stops processing of detecting the operation input contents (S108).

Thus, by performing processing of stopping detecting an operation input, it is possible to execute processing of accurately detecting operation input contents in a period in which the operator intentionally inputs an operation, and reliably stop detecting an operation input when the operator intentionally stops the operation input.

Figure 3:
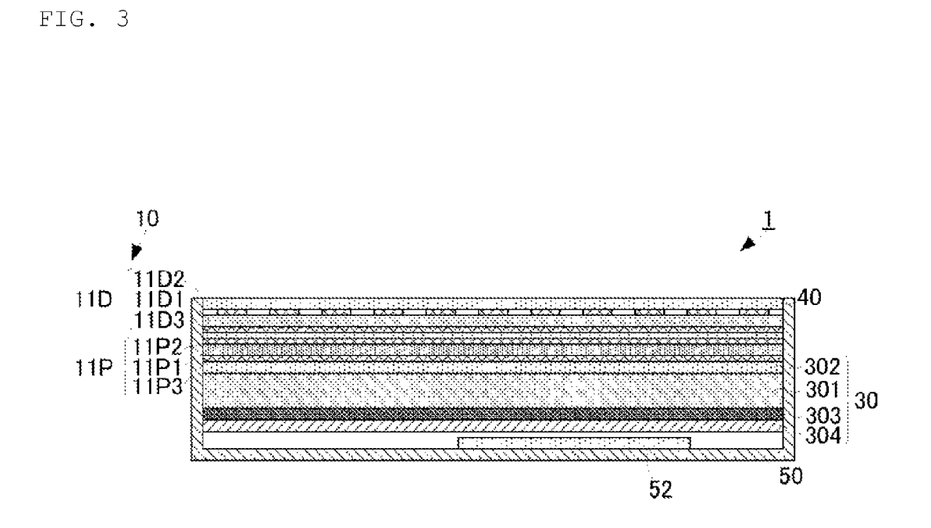
FIG. 3 is a side sectional view illustrating a configuration of the touch input device according to the present embodiment.
Figure 4A:
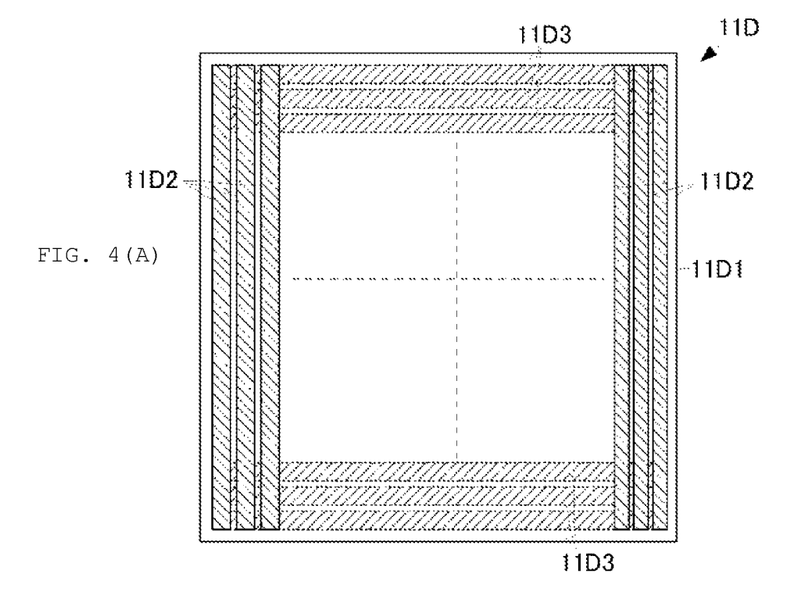
FIGS. 4(A) and 4(B) are plan views of a touch sensor and a pressing sensor according to the present embodiment.
Figure 4B:
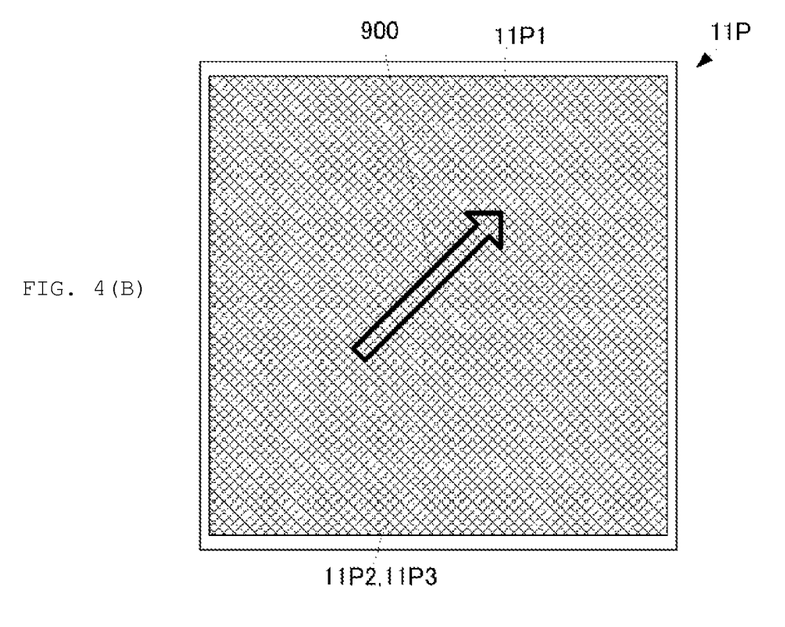

In addition, more specifically, the touch input device 1 can be realized by the following components. FIG. 3 is a side sectional view illustrating components of the touch input device according to the present embodiment. FIG. 4 is a plan view of the touch sensor and the pressing sensor according to the present embodiment. FIG. 4(A) is a plan view of the touch sensor, and FIG. 4(B) is a plan view of the pressing sensor.

As illustrated in FIG. 3, the touch input device 1 includes a housing 50. The housing 50 has a cubic shape, and is formed in a shape whose top surface is opened. In the housing 50, the touch sensor 11D, the pressing sensor 11P, the display unit 30 and a control circuit module 52 are arranged. The touch sensor 11D, the pressing sensor 11P and the display unit 30 have flat shapes, and flat surfaces of the touch sensor 11D, the pressing sensor 11P and the display unit 30 are arranged in the housing 50 in parallel to an opening surface of the housing 50. In this regard, the touch sensor 11D, the pressing sensor 11P and the display unit 30 are arranged in order from the opening surface side. A circuit board (not illustrated) is arranged between a bottom surface of the housing 50 and the display unit 30, and the control circuit module 52 is mounted on the circuit board. The control circuit module 52 is a module which realizes the control unit 20 and the memory unit 21, and is connected to the touch sensor 11D, the pressing sensor 11P and the display unit 30.

The touch sensor 11D includes an insulating substrate 11D1 of a flat shape. The insulating substrate 11D1 is made of a material having translucency. As illustrated in FIG. 4(A), a plurality of capacitance detection electrodes 11D2 are formed on one flat surface of the insulating substrate 11D1. The plurality of capacitance detection electrodes 11D2 each have an elongated shape, and are each formed in a shape whose elongation direction is along a first direction. The plurality of capacitance detection electrodes 11D2 are arranged at intervals along a second direction orthogonal to the first direction. A plurality of capacitance detection electrodes 11D3 are formed on the other flat surface of the insulating substrate 11D1. The plurality of capacitance detection electrodes 11D3 each have an elongated shape, and are each formed in a shape whose elongation direction is along the second direction. The plurality of capacitance detection electrodes 11D3 are arranged at intervals along the first direction. The pluralities of capacitance detection electrodes 11D2 and 11D3 are made of materials having translucency.

The touch sensor 11D detects by using the capacitance detection electrodes 11D2 and 11D3 a capacitance change produced when the operator's finger approaches or touches the operation surface, and outputs a signal based on this detection as an operation detection signal to the control circuit module 52.

The pressing sensor 11P includes a piezoelectric film 11P1 of a flat film shape. On each flat film surface which the piezoelectric film 11P1 faces, press detection electrodes 11P2 and 11P3 are formed. The press detection electrodes 11P2 and 11P3 are formed on a substantially entire surface of the flat film surface of the piezoelectric film 11P1.

The pressing sensor 11P detects by using the press detection electrodes 11P2 and 11P3 an electric charge produced by deflection of the piezoelectric film 11P1 when the operator presses the flat film surface, and outputs a signal based on this detection as a press detection signal to the control circuit module 52.

In addition, the piezoelectric film 11P1 is a film having piezoelectricity. However, the piezoelectric film 11P1 is preferably made of uniaxially stretched polylactic acid (PLA) and is more preferably made of poly-L-lactic acid (PLLA).

The PLLA is chiral polymer and a main chain adopts a spiral structure. The PLLA is uniaxially stretched and has piezoelectricity when molecules are oriented. Further, the uniaxially stretched PLLA produces an electric charge when the flat film surface of the piezoelectric film is pressed. In this regard, the amount of electric charges to be produced is uniquely determined based on a displacement amount of the flat film surface displaced by a press in a direction orthogonal to the flat film surface. A piezoelectric constant of the uniaxially stretched PLLA is very high among polymers.

Consequently, by using the PLLA, it is possible to reliably detect displacement caused by a press with a high sensitivity. That is, it is possible to reliably detect a press and detect a pressing amount with a high sensitivity.

In addition, a stretching rate is suitably about 3 to 8 fold. Performing heating processing after the stretching encourages crystallization of extended chain crystal of polylactic acid, and a piezoelectric constant improves. In addition, by varying stretching rates of axes when biaxial stretching is performed, it is possible to obtain the same effect as that of uniaxial stretching. When, for example, a given direction is an X axis, and stretching is performed eight times in an X axis direction and stretching is performed two times in a Y axis direction orthogonal to the X axis, it is possible to obtain for the piezoelectric constant a substantially equivalent effect as that of a case where uniaxial stretching is performed four times in the X axis direction. A simply uniaxially stretched film is easily broken in a stretching axis direction, so that it is possible to increase the strength to some degree by performing the above biaxially stretching.

Further, the PLLA produces piezoelectricity as a result of molecule orientation processing such as stretching, and does not require polling processing unlike other polymers such as PVDF or piezoelectric ceramics. That is, piezoelectricity of PLLA which does not belong to ferroelectrics does not appear due to ion polarization like ferroelectrics such as PVDF or PZT, and derives from a helical structure which is a characteristics structure of molecules. Hence, the PLLA does not produce pyroelectricity produced in piezoelectric bodies of other ferroelectrics. Further, PVDF or the like temporarily shows a fluctuation of a piezoelectric constant and the piezoelectric constant is remarkably low depending on cases. However, the piezoelectric constant of PLLA is temporarily very stable. Consequently, it is possible to detect displacement caused by a press with a high sensitivity without being influenced by surrounding environment.

As illustrated in FIG. 4(B), the uniaxially stretched piezoelectric film 11P1 is preferably arranged in the housing 50 such that a uniaxial stretching direction 900 forms an angle corresponding to nearly 45° in two orthogonal directions along a side surface of the housing 50. By providing such an arrangement, it is possible to detect displacement with a more sensitivity. Consequently, it is possible to detect a press and a pressing amount with a more sensitivity.

For the press detection electrodes 11P2 and 11P3, using one of organic electrodes whose main components are polythiophene or polyaniline and inorganic electrodes such as ITO, ZnO, silver nanowires, carbon nanotubes or graphene is preferable. By using these materials, it is possible to form a conductor pattern with high translucency.

The display unit 30 is formed as a so-called flat display, and is more specifically formed as a liquid crystal display element. The display unit 30 includes a liquid crystal panel 301, a top surface polarizing plate 302, a back surface polarizing plate 303 and a backlight 304. The top surface polarizing plate 302 and the back surface polarizing plate 303 are arranged sandwiching the liquid crystal panel 301. The backlight 304 is arranged on a side opposite to the liquid crystal panel 301 across the back surface polarizing plate 303.

The above configuration can realize the touch input device 1 employing the above circuit configuration. In addition, an aspect where the display unit 30 is arranged in the same housing 50 as that of the operation input units such as the touch sensor 11D and the pressing sensor 11P has been described in the present embodiment. However, the display unit 30 may be formed separately from the housing 50.

Figure 5:
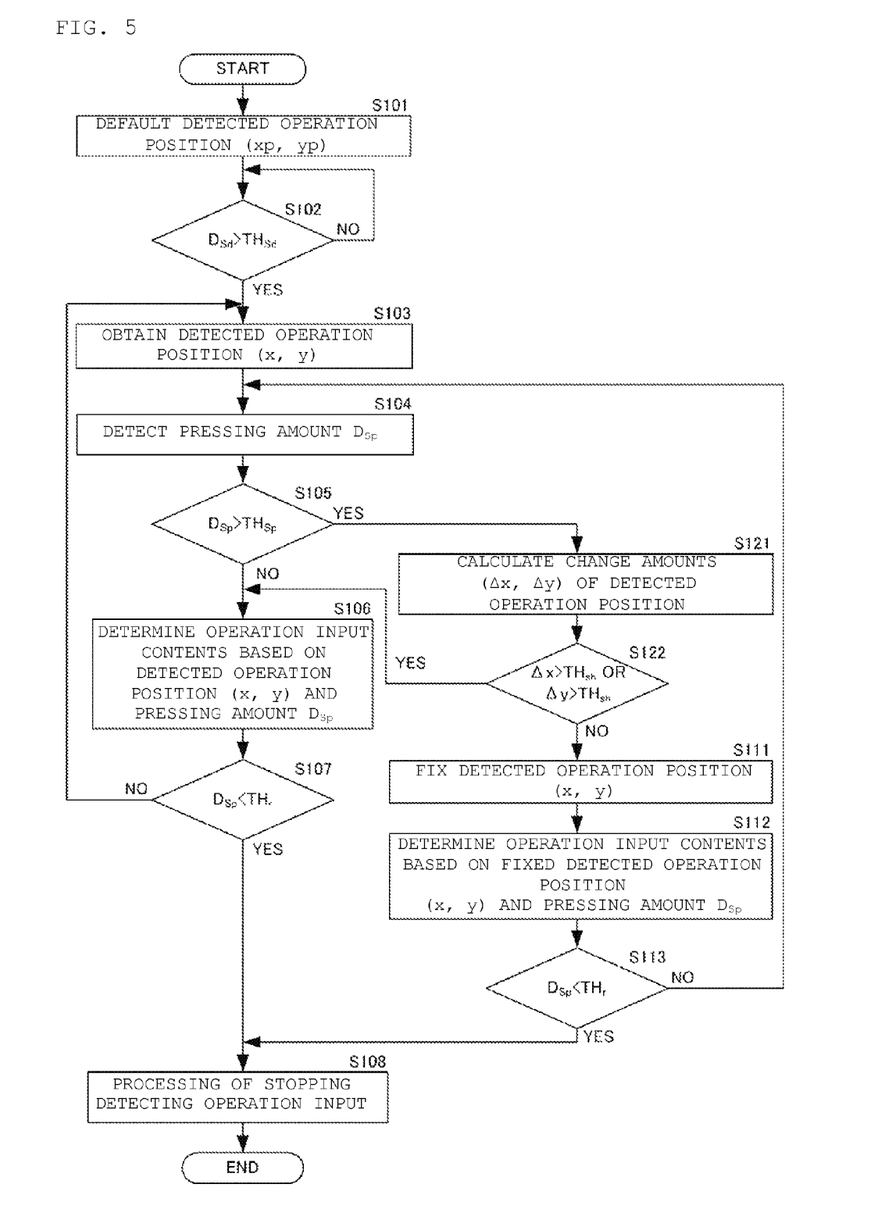
FIG. 5 is a flowchart illustrating processing executed by a control unit of a touch input device according to a second embodiment of the present invention.

Next, a touch input device according to a second embodiment of the present invention will be described with reference to the drawings. FIG. 5 is a flowchart illustrating processing executed by a control unit of the touch input device according to the second embodiment of the present invention. In addition, a signal level $D_{Sp}$ of a pressing force detection signal is indicated as a pressing amount $D_{Sp}$ also in FIG. 5. This is because that the signal level of the pressing force detection signal is determined depending on the pressing amount is regarded in the same way in terms of detection of the operation input contents.

The touch input device according to the present embodiment differs from the touch input device according to the first embodiment in processing of the control unit, and the other components are the same as those of the touch input device according to the first embodiment. Further, basic processing of the control unit is the same as that of the first embodiment, and only different portions will be specifically described below.

When determining that the pressing amount $D_{Sp}$ is larger than a first threshold $TH_{Sp}$ (S105: YES), the control unit 20 calculates change amounts ($\Delta x$, $\Delta y$) between detected operation positions at continuous sampling timings (S121). More specifically, when a detected operation position obtained at a given sampling timing T1 is ($x_{11}$, $y_{11}$) and a detected operation position obtained at a last sampling timing T0 is ($x_{12}$, $y_{12}$), change amounts are ($\Delta x = ABS(x_{T2} - x_{T1})$, $\Delta y = ABS(y_{T2} - y_{T1})$). In addition, ABS( ) represents an absolute value arithmetic operation.

The control unit 20 compares the change amounts $\Delta x$ and $\Delta y$, and a second threshold $TH_{Sh}$. The second threshold $TH_{Sh}$ is a threshold for detecting intentional movement of an operator's finger, and is set to, for example, a value having a sufficient margin with respect to a movement amount provided by the press.

When detecting whether or not the change amount $\Delta x$ is larger than the second threshold $TH_{Sh}$ and whether or not the change amount $\Delta y$ is larger than the second threshold $TH_{Sh}$ (S122: YES), the control unit 20 determines operation input contents based on a detected operation position (x, y) and the pressing amount $D_{Sp}$ detected at a point of time of the detection without fixing the detected operation position (x, y) (S106).

When detecting that both of the change amounts $\Delta x$ and $\Delta y$ are the second threshold $TH_{Sh}$ or less (S122: NO), the control unit 20 fixes the detected operation position (x, y) detected before detection of movement (S111).

In case where, by performing this processing, the operator performs an operation of moving the finger in a state where the operator increases the press (when, for example, the operator performs so-called sliding or flicking), it is possible to move a detected operation position, too, according to movement of the finger without fixing the detected operation position. Consequently, when the operator inputs an operation in a state where the operator increases the press, it is possible to accurately detect operation input contents which the operator intends.

Figure 6:
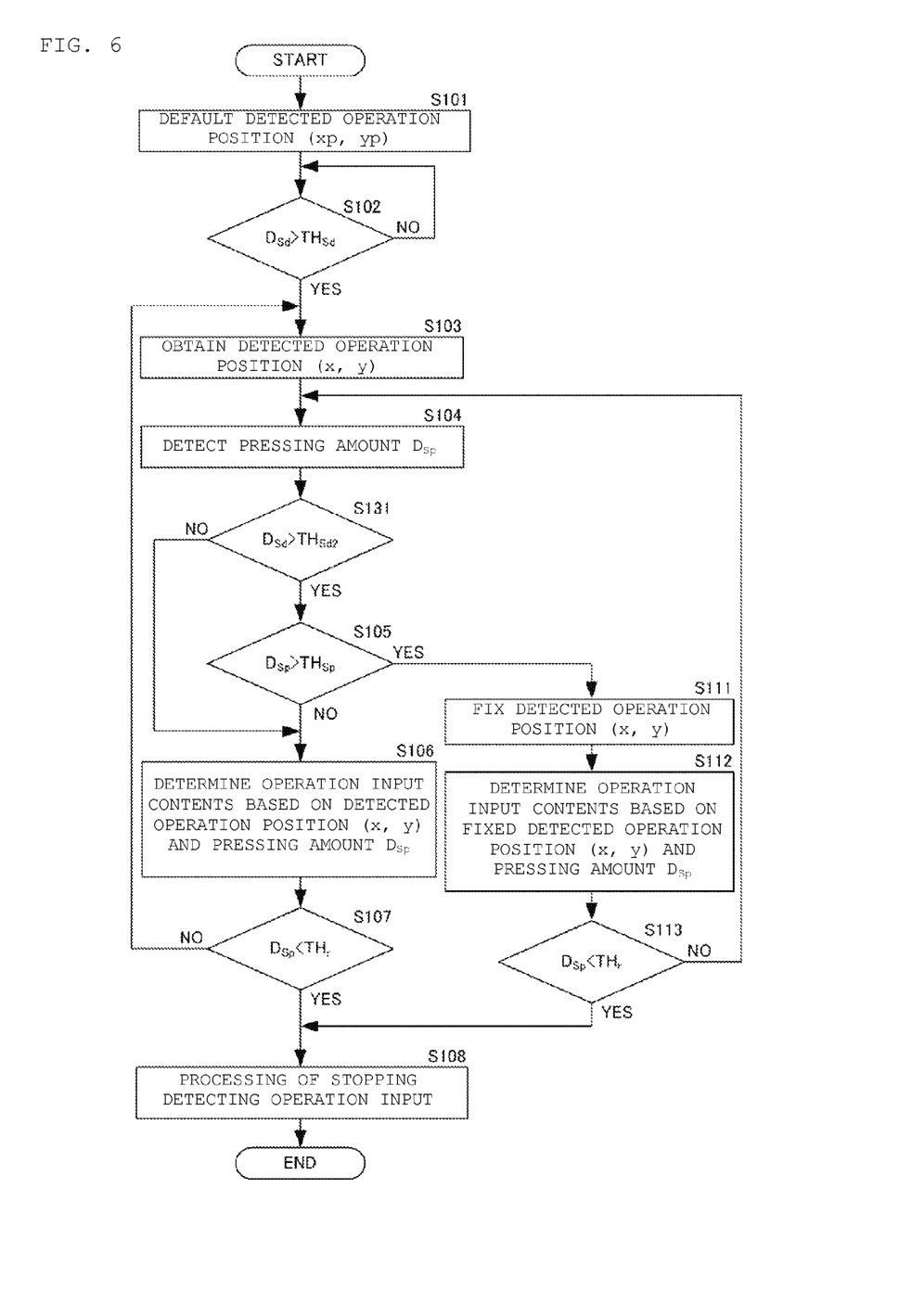
FIG. 6 is a flowchart illustrating processing executed by a control unit of a touch input device according to a third embodiment of the present invention.

Next, a touch input device according to a third embodiment of the present invention will be described with reference to the drawings. FIG. 6 is a flowchart illustrating processing executed by a control unit of the touch input device according to the third embodiment of the present invention. In addition, also in FIG. 6, a signal level $D_{Sp}$ of a pressing force detection signal is indicated as a pressing amount $D_{Sp}$. This is because that the signal level of the pressing force detection signal is determined depending on the pressing amount is regarded in the same way in terms of detection of the operation input contents.

The touch input device according to the present embodiment differs from the touch input devices according to the first and second embodiments in processing of the control unit, and the other components are the same as those of the touch input devices according to the first and second embodiments. Further, basic processing of the control unit is the same as that of the first embodiment, and only different portions will be specifically described below.

When detecting that a signal level $D_{Sd}$ has become larger than a touch detection threshold $TH_{Sd}$ (S102: YES), a control unit 20 obtains a detected operation position (x, y) based on the operation detection signal of a detection timing (S103). Subsequently, the control unit 20 obtains the pressing amount $D_{Sp}$ (S104).

When the signal level $D_{Sd}$ of the operation detection signal is larger than a touching object determination threshold $TH_{Sd2}$ (S131: YES), the control unit 20 determines whether or not the pressing amount $D_{Sp}$ is larger than a first threshold $TH_{Sp}$.

When the signal level $D_{Sd}$ of the operation detection signal is the touching object determination threshold (third threshold) $TH_{Sd2}$ or less (S131: NO), the control unit 20 determines operation input contents based on the detected operation position (x, y) and the pressing amount $D_{Sp}$ at a point of time of the detection without determining the pressing amount $D_{Sp}$ (S106).

The touching object determination threshold $TH_{Sd2}$ is preferably set to a value which is larger than the touch detection threshold $TH_{Sd}$ and makes it possible to distinguish between a finger pulp and a stylus or the like whose tip is thinner than the finger.

In case where an operator performs an operation with the fingertip or the stylus by performing this processing, it is possible to move a detected operation position according to movement of the fingertip or the stylus without fixing the operation position even when the press becomes larger than a predetermined threshold. Consequently, it is possible to prevent unintentional displacement of a detected position in a state where a press is increased at a fixed position when an operation is performed with the finger pulp, detect an operation position irrespective of a press when an operation is performed with a stylus whose tip is pointed, and accurately perform an operation of inputting minute characters, too.

In addition, processing according to the third embodiment and processing according to the second embodiment may be combined.

DESCRIPTION OF REFERENCE SYMBOLS

1: TOUCH INPUT DEVICE
10: OPERATION INPUT UNIT
11P: PRESSING SENSOR
11P1: PIEZOELECTRIC FILM
11P2, 11P3: PRESS DETECTION ELECTRODE
11D: TOUCH SENSOR
11D1: INSULATING SUBSTRATE
11D2, 11D3: CAPACITANCE DETECTION ELECTRODE
20: CONTROL UNIT
21: MEMORY UNIT
30: DISPLAY UNIT
301: LIQUID CRYSTAL PANEL
302: TOP SURFACE POLARIZING PLATE
303: BACK SURFACE POLARIZING PLATE
304: BACKLIGHT
50: HOUSING
52: CONTROL CIRCUIT MODULE

The invention claimed is:

1. A touch input device, comprising:
a touch sensor which detects an operation position on an operation surface inputted by a user's finger or a stylus and outputs a position detection signal indicative thereof, the value of the position detection signal changing as the operation position changes;
a pressure sensor which detects a pressing operation on the operation surface inputted by the user's finger or the stylus and outputs a pressure signal as a function thereof, the value of the pressure signal changing as the amount of pressure applied to the operation surface changes;
a controller which determines an operation input, the controller:
(i) determining whether the operation position has been input by the user's finger or the stylus; and
(ii) if the controller determines that the operation position has been input by the user's finger and not by the stylus:
(a) determining a first time instant when the pressure signal exceeds a first threshold value;
(b) storing a static value of the position detection signal which occurred before the first time instant; and
(c) after determining the first time instant, determining the operation input as a function of the stored static value of the position detection signal and the dynamic value of the pressure signal including pressure signals generated after the first time instant.

2. The touch input device according to claim 1, wherein the controller stores the value of the position detection signal at each of a plurality of instants before the first time instant and uses the last detection signal that was stored before the first time instant as the stored static value.

3. The touch input device according to claim 1, wherein the controller generates an output which varies depending on the operation input detected.

4. The touch input device according to claim 3, wherein the output is image data.

5. The touch input device according to claim 1, wherein the controller stores the static value of the position detection signal which occurred before the first time instant only after the pressure signal exceeds the first threshold value and a change amount of the detected operation position has become larger than a second threshold.

6. The touch input device according to claim 1, wherein the touch sensor generates an operation detection signal indicative of a quality of a touch on the operation surface and the controller does not determine the first time instant until after the signal level of the operation detection signal is greater than a third threshold.

7. The touch input device according to claim 1, wherein after the controller determines the operation input as a function of the stored static value of the pressure detection signal and the dynamic value of the pressure signal including pressure signals generated after the first time instant, it detects an end of an input operation when the value of the pressure signal falls below a third threshold.

8. The touch input device according to claim 1, wherein, before the controller determines the first time instant, it determines the operation input as a function of the dynamic values of the pressure detection and position detection signals.

9. The touch input device according to claim 8, wherein the controller detects an end of an input operation when the value of the pressure signal falls below a threshold value.

10. The touch input device according to claim 1, wherein the pressing sensor includes a uniaxially stretched polylactic acid piezoelectric film.

11. A touch input method, comprising:
using a touch sensor to detect an operation position on an operation surface inputted by a user's finger or a stylus and to output a position detection signal indicative thereof, the value of the position detection signal changing as the operation position changes;
using a pressure sensor to detect a pressing operation on the operation surface inputted by the user's finger or the stylus and to output a pressure signal as a function thereof, the value of the pressure signal changing as the amount of pressure applied to the operation surface changes;
using a controller to determine an operation input, the controller:
(i) determining whether the operation position has been input by the user's finger or a stylus; and
(ii) if the controller determines that the operation position has been input by the user's finger and not by the stylus:
(a) determining a first time instant when the pressure signal exceeds a first predetermined value;

(b) storing a static value of the position detection signal which occurred before the first time instant; and (c) after determining the first time instant, determining the operation input as a function of the stored static value of the pressure detection signal and the dynamic value of the pressure signal including pressure signals generated after the first time instant.

12. The touch input method according to claim 11, wherein the controller stores the value of the position detection signal at each of a plurality of instants before the first time instant and uses the last position detection signal that was stored before the first time instant as the stored static value.

13. The touch input method according to claim 11, wherein the controller generates an output which varies depending on the operation input detected.

14. The touch input method according to claim 13, wherein the output is image data.

15. The touch input method according to claim 11, wherein the controller stores the static value of the position detection signal which occurred before the first time instant only after the pressure signal exceeds the first threshold value and a change amount of the detected operation position has become larger than a second threshold.

16. The touch input method according to claim 11, wherein the touch sensor generates an operation detection signal indicative of a quality of a touch on the operation surface and the controller does not determine the first time instant until after the signal level of the operation detection signal is greater than a third threshold.

17. The touch input method according to claim 11, wherein after the controller determines the operation input as a function of the stored static value of the pressure detection signal and the dynamic value of the pressure signal including pressure signals generated after the first time instant, it detects an end of an input operation when the value of the pressure signal falls below a third threshold.

18. The touch input method according to claim 11, wherein, before the controller determines the first time instant, it determines the operation input as a function of the dynamic values of the pressure detection and position detection signals.

19. The touch input method according to claim 18, wherein the controller detects an end of an input operation when the value of the pressure signal falls below a second threshold value.

* * * * *